United States Patent
Cociglio et al.

(10) Patent No.: US 11,621,897 B2
(45) Date of Patent: Apr. 4, 2023

(54) ENABLING A PERFORMANCE MEASUREMENT IN A PACKET-SWITCHED COMMUNICATION NETWORK

(71) Applicant: TELECOM ITALIA S.p.A., Milan (IT)

(72) Inventors: Mauro Cociglio, Turin (IT); Giuseppe Fioccola, Naples (IT)

(73) Assignee: TELECOM ITALIA S.p.A., Milan (IT)

( * ) Notice: Subject to any disclaimer, the term of this patent is extended or adjusted under 35 U.S.C. 154(b) by 90 days.

(21) Appl. No.: 17/049,500

(22) PCT Filed: Apr. 23, 2019

(86) PCT No.: PCT/EP2019/060292
§ 371 (c)(1),
(2) Date: Oct. 21, 2020

(87) PCT Pub. No.: WO2019/206862
PCT Pub. Date: Oct. 31, 2019

(65) Prior Publication Data
US 2021/0250258 A1    Aug. 12, 2021

(30) Foreign Application Priority Data

Apr. 27, 2018  (IT) .......................... 102018000004914
Jun. 26, 2018  (IT) .......................... 102018000006649
Oct. 31, 2018  (IT) .......................... 102018000009943

(51) Int. Cl.
*H04L 43/022*  (2022.01)
*H04L 43/08*  (2022.01)

(52) U.S. Cl.
CPC ............ *H04L 43/022* (2013.01); *H04L 43/08* (2013.01)

(58) Field of Classification Search
CPC . H04L 43/0829; H04L 43/0864; H04L 43/08; H04L 43/087; H04L 2012/5649;
(Continued)

(56) References Cited

U.S. PATENT DOCUMENTS

2005/0122995 A1* 6/2005 Meyer .................. H04L 1/1803
                                                          370/473
2007/0047440 A1* 3/2007 Meyer .................. H04L 69/161
                                                          370/473
(Continued)

FOREIGN PATENT DOCUMENTS

WO   WO 2010/072251 A1   7/2010
WO   WO 2011/079857 A1   7/2011
(Continued)

OTHER PUBLICATIONS

International Search Report and Written Opinion dated Jun. 14, 2019 in PCT/EP2019/060292 filed on Apr. 23, 2019.
(Continued)

*Primary Examiner* — Joseph E Avellino
*Assistant Examiner* — Mon Cheri S Davenport
(74) *Attorney, Agent, or Firm* — Oblon, McClelland, Maier & Neustadt, L.L.P.

(57) ABSTRACT

It is disclosed a method for enabling a performance measurement in a packet-switched communication network. A first node and a second node exchange packets comprising a marking value, which they alternately switch between two alternative marking values. The second node in particular switches the marking value applicable to the packets addressed to the other node depending on the marking value comprised in packets received therefrom. The first node writes a sampling value in one packet addressed to the second node for each marking period. Upon reception of each packet comprising the sampling value, the second node copies the sampling value in a packet addressed to the first node. One or more measurement points may be provided between the two nodes, which provide performance parameters for the packets comprising the sampling value in both directions. Such performance parameters may be used for providing round trip time measurements.

11 Claims, 7 Drawing Sheets

(58) Field of Classification Search
CPC ............... H04L 2012/5647; H04L 43/022; H04L 43/16
See application file for complete search history.

(56) References Cited

U.S. PATENT DOCUMENTS

| | | | |
|---|---|---|---|
| 2016/0105353 A1* | 4/2016 | Cociglio | ............ H04L 43/0829 370/252 |
| 2016/0142309 A1* | 5/2016 | Ma | ............ H04L 45/74 370/392 |
| 2017/0244623 A1 | 8/2017 | Cociglio | |
| 2021/0250258 A1* | 8/2021 | Cociglio | ................ H04L 43/08 |

FOREIGN PATENT DOCUMENTS

| WO | WO 2013/174417 A1 | 11/2013 |
|---|---|---|
| WO | WO 2015/090364 A1 | 6/2015 |

OTHER PUBLICATIONS

Trammell et al., "The Addition of a Spin Bit to the QUIC Transport Protocol; draft-trammell-quic-spin-01", Internet-Draft: QUIC, Internet Engineering Task Force, IETF; Standard Working Draft, Internet Society (ISOC) 4, 2017, No. 1, pp. 1-22, XP015124750.

Fioccola et al., "Alternate-Marking Method for Passive and Hybrid Performance Monitoring", Internet Engineering Task Force, IETF; Standard, Internet Society (ISOC) 4, 2018, pp. 1-33, XP015125343.

Mizrahi et al., "Compact Alternate Marking Methods for Passive Performance Monitoring; draft-mizrahi-ippm-compact-alternate-marking-00", Internet-Draft: Network Working Group, Internet Engineering Task Force, IETF; Standard Working Draft, Internet Society (ISOC) 4, 2017, pp. 1-21, XP015122637.

* cited by examiner

ENABLING A PERFORMANCE MEASUREMENT IN A PACKET-SWITCHED COMMUNICATION NETWORK

TECHNICAL FIELD

The present invention relates to the field of communication networks. In particular, the present invention relates to a method for enabling a performance measurement in a packet-switched communication network, and to a packet-switched network configured to implement such method.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

Moreover, each packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

WO 2010/072251, in the name of the same Applicant, discloses a method for measuring packet loss on a packet flow which uses an alternate marking technique, whereby the packet flow to be measured is divided into blocks of packets comprising a marking bit set to a first value (e.g. "1") and blocks of packets comprising a marking bit set to a second value (e.g. "0"). The marking value is periodically switched, so that the blocks of packets marked by the first value are interleaved with the blocks of packets marked by the second value.

WO 2011/079857, in the name of the same Applicant, discloses a method for performing time measurements (one-way delay and/or one-way jitter) which uses the alternate marking technique described above.

WO 2013/174417, in the name of the same Applicant, discloses a method for performing average time measurements which uses the alternate marking technique described above.

WO 2015/090364, in the name of the same Applicant, discloses a method for performing time measurements on a packet flow which provides for dividing the packet flow into alternating blocks (by way of example, and not of limitation, using the alternating marking technique described above) and, for each block, marking a number of packets as samples to be subjected to individual time measurements. The sampling is applied so that at least a minimum time lapses between consecutive sample packets, which is shorter than a marking period but is long enough to prevent possible reception sequence errors involving consecutive sample packets.

Techniques are known which provide RTT (round-trip time) measurements, instead of one-way time measurements. Such techniques are helpful especially because they do not require mutual synchronization of the local clocks at the various network nodes.

As known, QUIC (Quick UDP Internet Connections) is a transport layer (layer 4) network protocol designed to support multiplexed connections between two endpoints over User Datagram Protocol (UDP). In order to manage reception sequence errors, the QUIC header comprises a packet number field, wherein a packet number is written in each packet upon its transmission.

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on two counter-propagating packet flows exchanged between two nodes. According to the Internet draft, both the nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. Since reception sequence errors may occur which involve packets around the edges of the spin bit signal, the edges of the spin bit signal as received at the server may be not sharp, namely they may exhibit oscillations of the spin bit value. In order to filter out such oscillations, the Internet draft provides for delaying reflection of the edges of the spin bit signal at the server using a mechanism based on the value of the above mentioned packet number comprised in the QUIC header of the received packets. Basically, the server does not change its spin bit value until the packet number in the received packets has reached its maximum value. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has noticed that the above spin bit technique substantially results in an alternating marking of both the counter-propagating flows of packets exchanged between client and server. Hence, two measurement points provided in intermediate positions between client and server could provide performance measurements according to the above mentioned WO 2010/072251, WO 2011/079857 and WO 2013/174417.

However, the spin bit technique does not allow the intermediate measurement points identifying any specific sample packet which may be subjected to an individual time measurement.

The Applicant has noticed that a sampling technique as described in the above mentioned WO 2015/090364, separately implemented in each direction, would provide in each direction sample packets that could be subjected to individual, one-way time measurements.

However, such sample packets can not be correlated to provide reliable, individual RTT measurements between the two intermediate measurement points.

In view of the above, the Applicant has tackled the problem of providing a method for enabling a performance measurement in a packet-switched communication network, which is applicable in a scenario where alternate marking in two counter-propagating directions is applied (by way of example and not of limitation, using the above described spin-bit technique) and which at the same time allows one or more intermediate measurement points to identify specific sample packets in each direction, which may be subjected to individual time measurements, in particular to RTT measurements.

In the following description and in the claims, the expression "performing a performance measurement in a packet-switched communication network" will designate an operation of measuring a packet loss and/or a delay and/or a jitter undergone by a plurality of sample packets selected amongst a plurality of packets exchanged between two nodes of the packet-switched communication network.

Further, in the following description and in the claims, the expression "enabling a performance measurement in a packet-switched communication network" will designate an operation of marking and/or conditioning packets exchanged between two nodes of the packet-switched communication network in such a way that a performance measurement can be made, possibly at intermediate nodes.

According to embodiments of the present invention, the above problem is solved by a method wherein a first node and a second node of a communication network exchange packets comprising a marking value, which is alternately (e.g., periodically) switched between two alternative marking values so as to implement an alternate marking in each direction. The switching performed by the second node is dependent on the marking value comprised in the packets received from the first node. During each period comprised between two consecutive switching of the marking value applicable to packets to be transmitted to the second node (also termed herein after "marking period"), the first node writes a sampling value in one packet to be transmitted to the second node. Upon reception from the first node of each packet comprising the sampling value, the second node copies the sampling value in one packet to be transmitted to the first node.

One or more measurement points may then provide performance parameters relating to the packets comprising the sampling value, based on which a perform measurement can then be performed. It shall be noticed that the measurement point(s) may be implemented and operated by an entity other than the entity managing the marking of the packets at the first and second nodes of the communication network.

In the present description and in the claims, the expression "copying the sampling value" will be intended as an operation of writing in a packet to be transmitted to the first node a sampling value which depends on the sampling value comprised in the packet received from the first node. The sampling value to be written may be equal to the sampling value comprised in the received packet or it may be different. In any case, a predetermined, biunique relationship, which is known to both the second node and the one or more measurement points, exists between the sampling value which the second node writes in the packet to be transmitted to the first node and the sampling value comprised in the packet which the second node receives from the first node.

The fact that the first node generates a single sample packet for each marking period and that the second node reflects the sampling value upon reception of each sample packet, guarantees that during each marking period a single couple of counter-propagating sample packets is exchanged between the first node and the second node, which comprise both the same sampling value and the same marking value (or, at least, sampling values reciprocally related, as described above).

Hence, in each direction the sample packets may be singularly identified by one or more measurement point(s), which may provide performance parameters relating to the sample packets and perform on them one-way time measurements based on their performance parameters, as described by the above mentioned WO 2015/090364.

Moreover, the measurement point(s) may also perform RTT measurements based on performance parameters (in particular, timestamps) generated for each couple of counter-propagating sample packets. This latter operation particularly benefits from the behaviour of the first node and second node. Within each marking period, indeed, a single couple of counter-propagating sample packets is expected, upon which the RTT measurement shall be made. The measurement point(s) may therefore uniquely and non-ambiguously identify them based on their marking value and sampling value, thereby providing reliable and accurate RTT measurements. If, for instance, during a marking period the "reflected" sample packet is lost before it reaches the measurement point(s), the measurement point(s) are capable of detecting the loss (the "reflected" sample packet expected during the current marking period is not found within the packets transmitted from the second node to the first node) and therefore refrain from providing RTT measurement based on samples for that marking period.

Moreover, a measurement point may also provide an RTT measurement between the first node and the second node based on the performance parameters (in particular, timestamps) generated for two consecutive sample packets transmitted in a same direction (e.g. from the first node to the second node). This is advantageously easier for the measurement point than the above described known measurement as duration of the spin bit period. Identifying the sample packets in the packet flow in a certain direction is indeed more immediate for a measurement point than identifying the edges of the spin bit signal which, as described above, may be non sharp.

According to a first aspect, the present invention provides a method for enabling a performance measurement in a packet-switched communication network, the method comprising:

a) exchanging between a first node and a second node of the communication network packets comprising a marking value, wherein the marking value is alternately switched between two alternative marking values, switching the marking value to be applied to packets to be transmitted to the first node by the second node being dependent on the marking value comprised in packets received at the second node from the first node;

b) at the first node, during each marking period, writing a sampling value in one packet to be transmitted to the second node; and c) at the second node, upon reception from the first node of each packet comprising the sampling value, copying the sampling value in one packet to be transmitted to the first node.

Preferably, step b) comprises:

b1) writing the sampling value in the $n^{th}$ packet to be transmitted after the beginning of a marking period, n being an integer equal to or higher than 1; or b2) upon reception from the second node of a preceding packet comprising the sampling value, copying the sampling value in one packet to be transmitted to the second node.

According to an embodiment, step b) comprises:

step b1) during the first marking period of each marking cycle; and step b2) during the second marking period of each marking cycle.

According to another embodiment, step b) comprises:

step b1) during each marking period at which said performance measurement is started or restarted; and step b2) during each marking period other than said each marking period at which said performance measurement is started or restarted.

According to a first embodiment, at step a) both the first node and the second node switch the marking value to be applied to packets to be transmitted to the other node upon detection of a change of the marking value in packets received from the other node.

According to the first embodiment, at step a) the switching the marking value to be applied to packets to be transmitted to the other node comprises, at the first node and/or at the second node, for each packet received from the other node, checking whether the received packet has a marking value different from the previously received packet and, in the affirmative:

switching the marking value to be applied to packets to be transmitted to the other node and disabling further switching of the marking value to be applied to packets to be transmitted to the other node until a predefined condition is fulfilled;

upon occurrence of the predefined condition, enabling further switching of the marking value to be applied to packets to be transmitted to the other node.

According to variants of the first embodiment, the predefined condition is one of the following:

a security gap time having a predefined duration is lapsed;

a packet number comprised in packets received from the other node has increased to a maximum value, returned back to 0 and then reached again the value that was comprised in the received packet whose marking value was different from the previously received packet; or N packets have been received from the other node, N being a predefined number.

According to a second embodiment, at step a) the second node switches the marking value to be applied to packets to be transmitted to the first node with a delay with respect to detection of a change of the marking value in packets received from the first node.

According to the second embodiment, at step c) copying the sampling value comprises checking whether the marking value of the received packet comprising the sampling value is equal to the marking value currently applied to packets to be transmitted to the first node and:

c1) in the affirmative, copying the sampling value in one packet to be transmitted to the first node;

c2) in the negative, waiting until the marking value to be applied the packets to be transmitted to the first node is switched again and then performing step c1).

According to a variant of the second embodiment, at step c) copying the sampling value comprises, when the packet comprising the sampling value is received at the second node from the first node:

writing the marking value of the received packet and the sampling value in a local variable initialized at the second node;

checking whether the marking value currently applied to the packets to be transmitted to the first node is equal to a portion of the local variable;

in the affirmative, performing step c1) and resetting the local variable;

in the negative, maintaining the local variable until next switch of the marking value to be applied to the packets to be transmitted to the first node.

According to a second aspect, the present invention provides a method for performing a performance measurement in a packet-switched communication network, the method comprising the steps of the method for enabling a performance measurement as set forth above and:

d) at at least one measurement point, providing performance parameters relating to the packets comprising the sampling value, the performance measurement being based on said performance parameters.

According to an embodiment:

step b) comprises, during each marking period, writing a number k of different sampling values in a corresponding number k of packets, respectively, to be transmitted to the second node (2);

step c) comprises, upon reception from the first node) of each packet comprising anyone of the number k of sampling values, copying the sampling value in one packet to be transmitted to the first node; and step d) comprises providing performance parameters relating to packets comprising anyone of the number k of sampling values.

Preferably, at step d) the performance parameters comprise timestamps indicating the transit time of the packets comprising the sampling value through the at least one measurement point.

According to an embodiment, at step d) providing performance parameters is performed by two measurement points.

According to such embodiment, preferably, at step d) the performance measurement comprises a one-way time measurement and/or a round-trip time measurement between the two measurement points.

Optionally, the performance measurement comprises a round-trip performance measurement between the first node and the second node as measured by the at least one measurement point based on the performance parameters relating to the packets comprising the sampling value.

According to a third aspect, the present invention provides a method for exchanging packets between a first node and a second node of a packet-switched communication network, the method comprising:

a) alternately switching a marking value comprised in the packets between two alternative marking values, switching the marking value to be applied to packets to be transmitted to the first node by the second node being dependent on the marking value comprised in packets received at the second node from the first node;

b) at the first node, during each marking period, writing a sampling value in one packet to be transmitted to the second node; and c) at the second node, upon reception from the first node of each packet comprising the sampling value, copying the sampling value in one packet to be transmitted to the first node.

According to a fourth aspect, the present invention provides a packet-switched communication network comprising a first node and a second node configured to exchange packets comprising a marking value, wherein the marking value is alternately switched between two alternative marking values, the second node being configured to switch the marking value to be applied to packets to be transmitted to the first node depending on the marking value comprised in packets received from the first node, wherein:

the first node is configured to, during each marking period, write a sampling value in one packet to be transmitted to the second node; and the second node is configured to, upon reception from the first node of each packet comprising the sampling value, copy the sampling value in one packet to be transmitted to the first node.

Preferably, the packet-switched communication network also comprises at least one measurement point configured to provide performance parameters relating to the packets comprising the sampling value.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
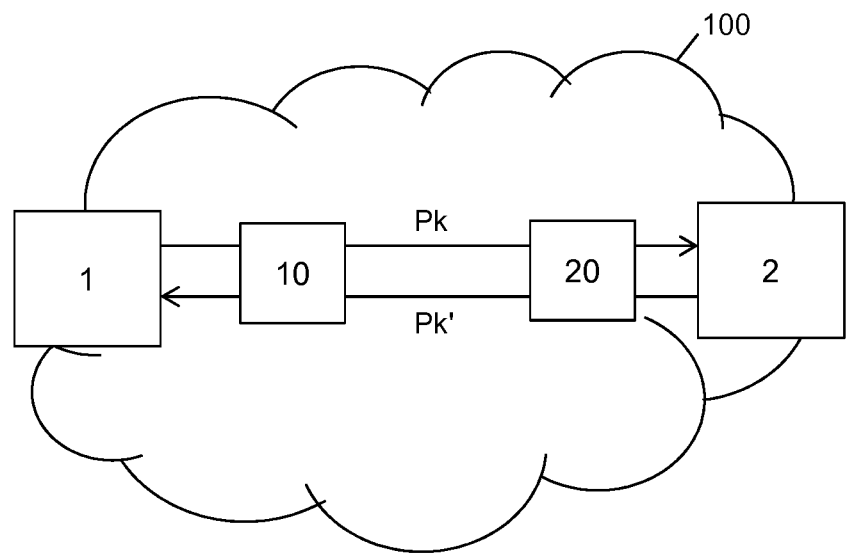
FIG. 1 schematically shows a packet-switched communication network in which the method for enabling a performance measurements according to embodiments of the present invention is implemented.

FIG. 1 schematically shows a packet-switched communication network 100 configured to enable performance measurements according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The node 1 is configured to transmit packets Pk to the node 2, while the node 2 is configured to transmit packets Pk' to the node 1, as schematically depicted in FIG. 1. The packets Pk may belong to a same packet flow (namely, they may all have a same source address and a same destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
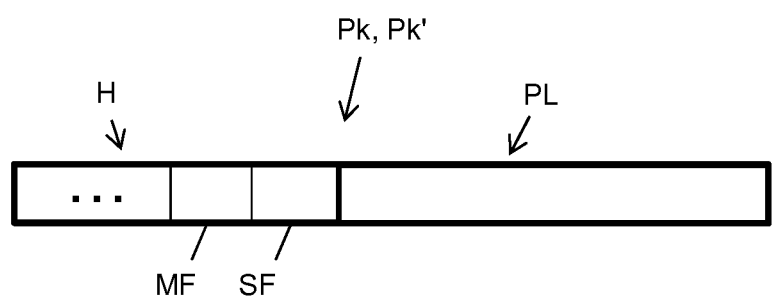
FIG. 2 schematically shows the structure of a packet exchanged in the communication network of FIG. 1, according to embodiments of the present invention.

As schematically depicted in FIG. 2, each packet Pk, Pk' comprises a payload PL and a header H. The payload PL comprises user data. The header H of each packet Pk, Pk' is formatted according to the network protocol supported by the network 100 and comprises packet forwarding information (not shown in FIG. 2), namely information allowing the nodes of the network 100 to properly handle the packets Pk, Pk' so that they reach their destination nodes.

According to embodiments of the present invention, the header H of each packet Pk, Pk' preferably also comprises a marking field MF and a sampling field SF.

The marking field MF comprises one or more bits, preferably a single bit. The marking field MF may be set to anyone of two different marking values MA, MB (e.g. "1" and "0", in case of a single bit marking field) in order to implement an alternate marking technique, as it will be described in detail herein after.

The sampling field SF comprises one or more bits. In the following description, for simplicity, reference will be made to a case where the sampling field SF comprises a single bit. The sampling field SF may be accordingly set to either a sampling value SV indicating a packet to be subjected to individual time measurement (also termed in the following description "sample packet") or a non sampling value NSV indicating a packet not to be subjected to individual time measurement (also termed in the following description "non sample packet"). For instance, in case of single bit sampling field SF, the sampling value SV may be "1" and the non sampling value NSV may be "0".

The header H of each packet Pk, Pk' may also comprise a packet number field (not shown in FIG. 2) wherein a sequence number may be written upon transmission of the packet Pk, Pk'. The packet number field may be for instance that provided by the above mentioned QUIC protocol. With reference now to the flow chart of FIG. 3, the operation of the node 1, which transmits packets Pk to the node 2 and receives packets Pk' therefrom, will be now described in detail, according to an embodiment of the present invention.

The node 1 preferably implements an alternate marking technique on the packets Pk. In particular, the node 1 preferably writes in the marking field MF of each packet Pk to be transmitted a marking value, which is alternately switched between the two marking values MA and MB. The time lapsing between two consecutive switching of the marking value is termed herein after "marking period".

Hence, during a marking period, the node 1 transmits to the node 2 packets Pk having their marking field MF set to one of the values MA, MB, e.g. MA. Then, upon expiration of the marking period, the node 1 switches to the other marking value MB, so that during the subsequent time period it will transmit to the node 2 packets Pk having their marking field set to MB. And so on. The iterated switching between the two marking values MA, MB results in the flow of packets Pk being divided into blocks of packets Pk marked by MA and blocks of packets Pk marked by MB reciprocally interleaved, namely alternating in time.

Preferably, the node 1 switches the marking value upon detection of a change of the marking value in the packets Pk' received from the node 2 (as it will be described in detail herein after, also the node 2 preferably implements an alternate marking on the packets Pk'). This latter situation, which occurs for instance when the above described spin bit technique of the QUIC protocol is applied, results in marking periods of variable duration, depending on the round-trip time between the nodes 1 and 2. This is however not limiting. For instance, according to other variants, the node 1 may switch the marking value every T seconds, T having a predetermined value. Such value may be constant, thereby providing marking periods having all a duration equal to T. Alternatively, T may be switched between two different values, thereby providing marking periods with a certain duration that alternate in time with marking periods with another duration. Alternatively, the node 1 may switch the marking value every N packets Pk transmitted to the node 2. In this case, the marking period depends on the packet rate from the node 1 to the node 2, which may be variable and then provide marking periods of variable duration.

Figure 3:
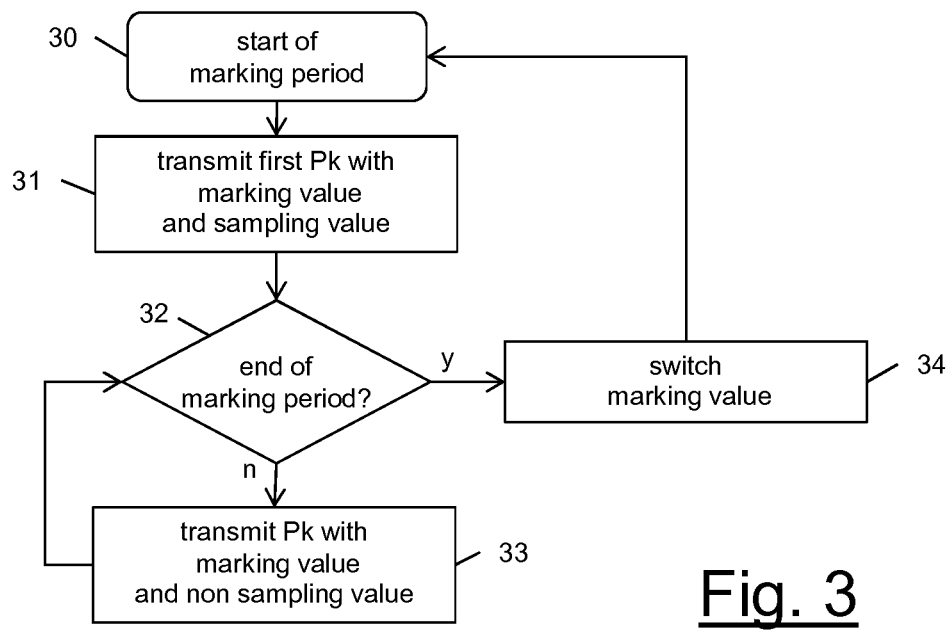
FIG. 3 is a flow chart of the operation of a first node of the communication network of FIG. 1, according to a first embodiment of the present invention.

With reference now to the flow chart of FIG. 3, in order to implement an exchange of packets according to embodiments of the present invention, at the beginning of each marking period (step 30) triggered by the node 1 switching the applicable marking value from MA to MB or vice versa, the node 1 marks one of the packets Pk to be transmitted to the node 2 as a sample packet (step 31). Preferably, such packet is the first one to be transmitted after the beginning of the marking period. To this purpose, the node 1 preferably writes in such Pk:
  (i) the currently applicable marking value (e.g. MA) in its marking field MF; and
  (ii) the sampling value SV in its sampling field SF.

Then, until the end of the current marking period (step 32), the node 1 continues marking the packets Pk to be transmitted to the node 2 as non sample packets (step 33), by writing:
  (i) the currently applicable marking value (e.g. MA) in their marking fields MF; and
  (ii) the non sampling value NSV in their sampling fields SF.

Upon expiration of the marking period, the node 1 switches the marking value (e.g. from MA to MB) (step 34) and reverts to step 30. Steps 31-34 are then iterated at each marking period. This way, the node 1 divides the flow of packets Pk into blocks of packets Pk marked by MA and blocks of packets marked by MB reciprocally interleaved, as described above. Besides, the node 1 marks the first packet Pk transmitted during each marking period as a sample packet.

It shall be noticed that, according to other variants not shown in the drawings, the node 1 could mark as sample packet not the first packet Pk to be transmitted during each marking period, but a subsequent one. The node 1 for instance could mark as sample packet the $n^{th}$ packet Pk to be transmitted during each marking period, where n is an integer number having a predefined value (e.g. 5). This way, when a new marking period starts, the node 1 marks the first n−1 packets Pk to be transmitted as non sample packets, then the $n^{th}$ one as a sample packet. Then, if further packets Pk have to be transmitted before the marking period ends, the node 1 marks them as non sample packets. If less than n packets are to be transmitted during a marking period, during that marking period no packet Pk will be marked as sample packet. In any case, the node 1 shall ensure that no more than one sample packet is provided for each marking period.

With reference now to the flow chart of FIG. 4a, the operation of the node 2 receiving the packets Pk from the node 1 and transmitting the packets Pk' thereto according to a first embodiment of the present invention will be described in detail.

Similarly to the node 1, the node 2 implements an alternate marking technique on the packets Pk'. In particular, the node 2 preferably writes in the marking field MF of each packet Pk' to be transmitted a marking value, which is alternately switched between two marking values MA and MB. Preferably, the node 2 switches the marking value applied to the packets Pk' to be transmitted to the node 1 depending on the marking value comprised in the packets Pk received from the node 1. In particular, the node 2 preferably switches the marking value upon detection of a change of the marking value in the received packets Pk, for example as described above with reference to the spin bit technique of the QUIC protocol. Hence, when the node 2 determines that the marking value in the received packets Pk has changed e.g. from MA to MB, it preferably switches the marking value applicable to packets Pk' to from MA to MB. Hence, also at the node 2 the iterated switching between the two marking values MA, MB results in the flow of packets Pk' being divided into blocks of packets Pk' marked by MA and blocks of packets Pk' marked by MB reciprocally interleaved, namely alternating in time.

According to embodiments of the present invention, while the node 2 implements the alternate marking on the packets Pk' to be transmitted to the node 1, it also continuously monitors reception of possible sample packets Pk from the node 1.

Figure 4A:
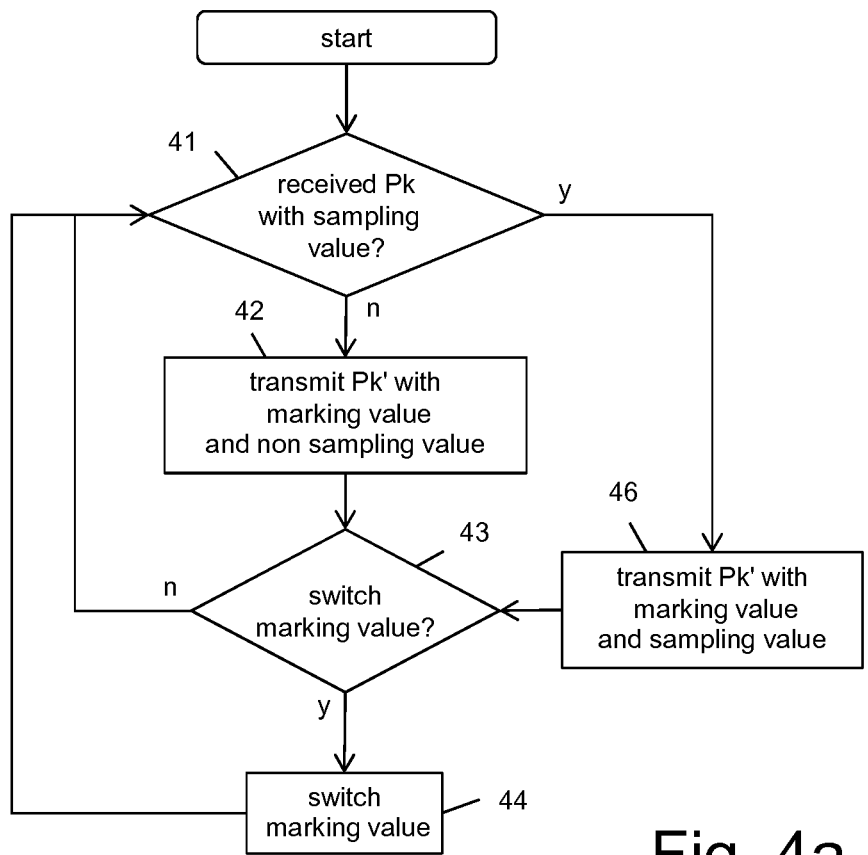
FIGS. 4a and 4b are flow charts of the operation of a second node of the communication network of FIG. 1, according to two embodiments of the present invention.

In particular, with reference to the flow chart of FIG. 4a, while the node 2 does not receive any sample packet Pk from the node 1 (step 41), it preferably marks the packets Pk' to be transmitted to the node 1 as non sample packets (step 42), by writing:
  (i) the currently applicable marking value (e.g. MA) in their marking fields MF; and
  (ii) a non sampling value NSV in their sampling fields SF.

When the node 2 determines that a switching of the marking value to be applied to packets Pk' is required (step 43), the node 2 switches the marking value (e.g. from MA to MB) (step 44) and reverts to step 41. As long as it continues not receiving any sample packet Pk from the node 1, the node 2 then iterates steps 41-44. This way, the node 2 divides the flow of packets Pk' into blocks of packets Pk' marked by MA and blocks of packets marked by MB reciprocally interleaved, as described above.

When the node 2 receives from the node 1 a sample packet Pk, it preferably marks the next packet Pk' to be transmitted to the node 1 as a sample packet (step 46). To this purpose, the node 2 preferably writes in the next packet Pk' to be transmitted to the node 1:

(i) the currently applicable marking value (e.g. MA) in its marking field MF; and (ii) a sampling value SV in its sampling field SF.

It may be appreciated that, due to the fact that the node 2 switches the marking value applied to the packets Pk' depending on the marking value comprised in the packets Pk received from the node 1, the marking value applied by the node 2 to such packet Pk' at step 46 is typically equal to the marking value comprised in the sample packet Pk received from the node 1.

Then, the node 2 preferably reverts to step 43, namely it continues transmitting non sample packets Pk' with the currently applicable marking value (step 42), until it determines that a further switching of the marking value to be applied to packets Pk' is needed (steps 43, 44). Such operation continues until reception of a subsequent sample packet Pk from the node 1, which triggers again execution of step 46.

Hence, according to the flow charts of FIGS. 3 and 4a, the node 1 provides a single sample packet for each marking period and the second node 2 provides a single, corresponding counter-propagating sample packet for each sample packet received from the node 1. This guarantees that, during each marking period, a single couple of counter-propagating sample packets is exchanged between the nodes 1 and 2, which comprise both the same sampling value and the same marking value.

Hence, in each direction the sample packets may be identified by any measurement point (placed e.g. between the nodes 1 and 2, or at anyone of the nodes 1 or 2), which may perform on them one-way time measurements and/or RTT measurements based on their performance parameters, as it will be described in detail herein after.

According to the first embodiment, it has been assumed that—when a sample packet Pk is received at the node 2—the marking value currently applied by the node 2 to packets Pk' is equal to the marking value comprised in the received sample packet Pk.

However, in some cases, the marking value currently applied by the node 2 to packets Pk' might be different from the marking value comprised in the received sample packet Pk. This may be the case, for instance, when the node 2 delays the switching of the marking value, in order to filter out oscillations of the marking value of the received packets Pk due to reception sequence errors occurring between packets Pk transmitted by the node 1 at the boundary between consecutive marking periods. Such a delay may be based, for example, on the value of the packet number comprised in the received packets Pk, as described above with reference to the known spin bit technique.

Figure 4B:
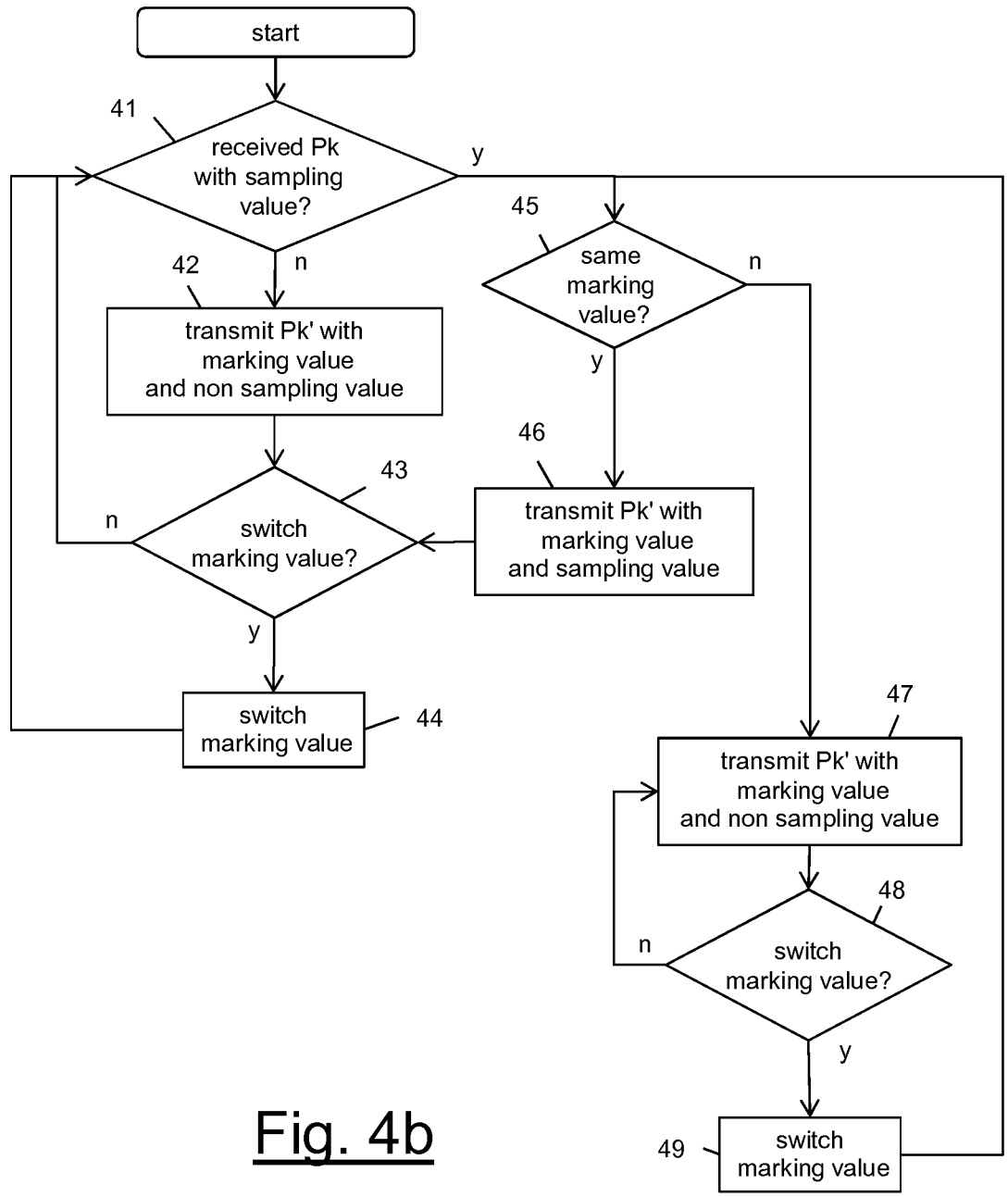

FIG. 4b is a flow chart of the operation of the node 2 according to another embodiment of the present invention, which is applicable in situations wherein the marking value currently applied by the node 2 to packets Pk' might be different from the marking value comprised in the received sample packet Pk.

Steps 41-44 are the same as in the flow chart of FIG. 4a. Hence, a detailed description will not be repeated.

According to this embodiment, when the node 2 receives from the node 1 a sample packet Pk, it preferably checks the marking value written in its marking field MF (step 45).

If the marking value comprised in the marking field MF of the received sample packet Pk is equal to the marking value currently applied by the node 2 to the packets Pk' to be transmitted to the node 1, the node 2 preferably marks the next packet Pk' to be transmitted to the node 1 as a sample packet (step 46). To this purpose, the node 2 preferably writes in the next packet Pk' to be transmitted to the node 1:

(i) the currently applicable marking value (e.g. MA) in its marking field MF; and (ii) the sampling value SV in its sampling field SF.

Then, the node 2 preferably reverts to step 43, namely it continues transmitting non sample packets Pk' with the currently applicable marking value (step 42) until it determines that the marking value it is applying to packets Pk' shall be switched (steps 43, 44). Such operation continues until reception of a subsequent sample packet Pk from the node 1, which triggers a new check of step 45.

If, instead, at step 45 it is determined that the marking value comprised in the marking field MF of the received sample packet Pk is different from the marking value currently applied by the node 2 to the packets Pk' to be transmitted to the node 1 (which may occur e.g. if the node 2 is delaying the switching of the marking value), the node 2 preferably continues marking the packets Pk' to be transmitted to the node 1 as non sample packets (step 47) until it determines that the marking value it is applying to packets Pk' shall be switched (steps 48, 49).

Then, the node 2 preferably reverts to step 45, thereby checking again if the marking value comprised in the marking field MF of the received sample packet Pk is equal to the applicable marking value following the switching at step 49. Such new check 45 provides a positive outcome, which induces the node 2 to perform the above described step 46 of marking the next packet Pk' to be transmitted to the node 1 as a sample packet. Since the marking value has been switched, at step 46 the currently applicable marking value to be written in the marking field MF of the sample packet Pk' will be the one following the switching of step 49.

According to an exemplary implementation of the embodiments of FIG. 4b, wherein both the marking field MF and the sampling field SF comprise a single bit, the node 2 may initialize a 2-bit local variable LV=(b1, b2). As a sample packet Pk is received from the node 1 (step 41), the node 2 preferably writes the value of the marking field MF (also termed herein after "marking bit") and the value of the sampling field SF (also termed herein after "sampling bit") in the bits b1 and b2 of the local variable LV, respectively. In order to perform the check of step 45, the bit b1 of the local variable LV is compared with the marking value currently applicable by the node 2 to the packets Pk'.

If the outcome of the check at step 45 is positive, the above described step 46 is performed and the value of the local variable LV is reset before reverting to step 43. The value of the local variable LV is then (0, 0) until the next sample packet Pk is received at the node 2.

If instead the outcome of the check at step 45 is negative, the value of the local variable LV is maintained until the marking value is switched (steps 48, 49) and the node reverts to step 45. The check is then repeated by comparing the bit b1 of the local variable LV with the applicable marking following the switching step 49. Since the outcome of this check is positive, the node 2 performs step 46 and resets the value of the local variable LV before reverting to step 43 and waiting for new sample packets.

Figure 5:
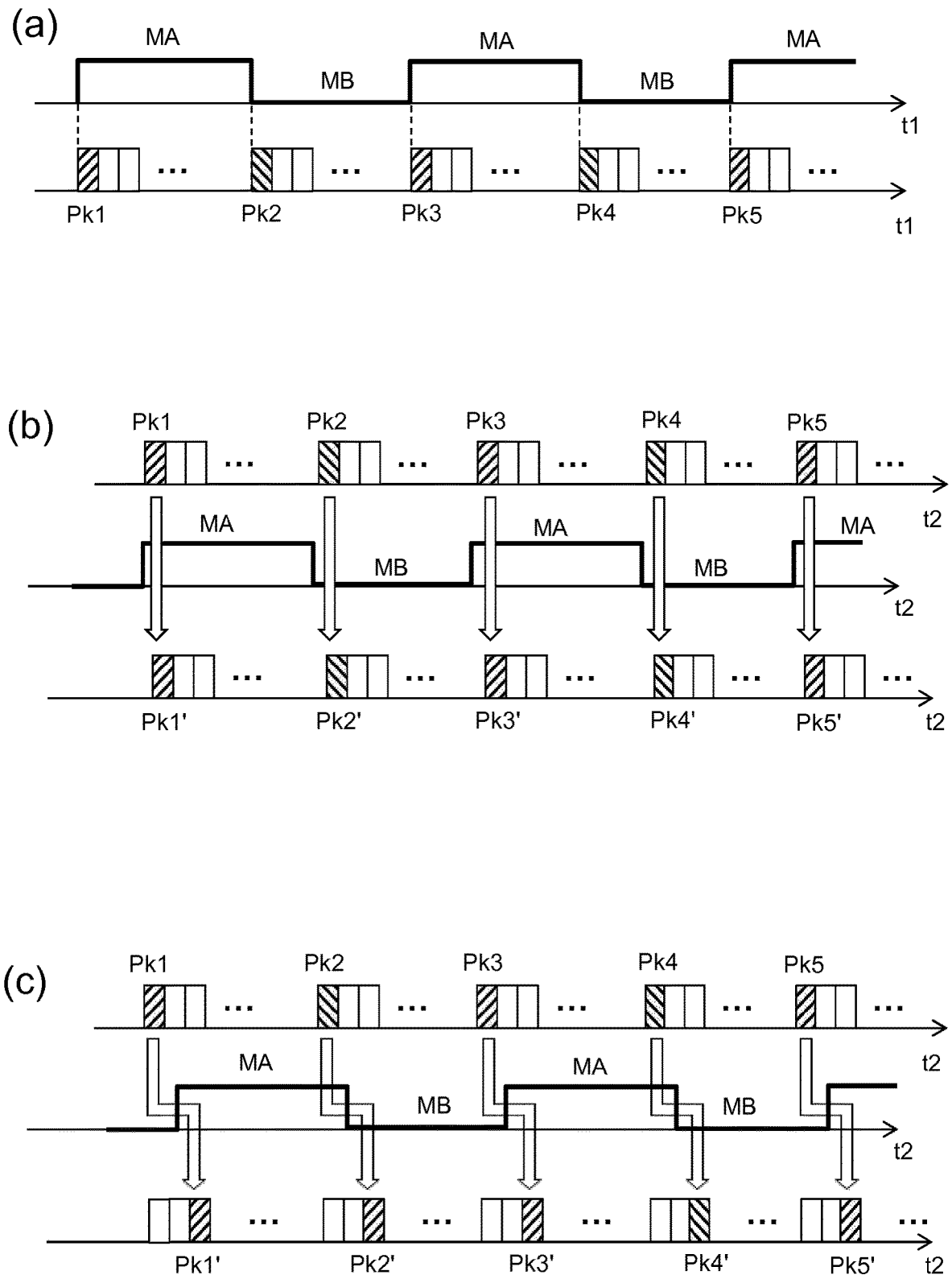
FIG. 5 are time diagrams schematically depicting the operation of the two nodes according to the flow charts of FIGS. 3, 4a and 4b.

The result of the behaviour of nodes 1 and 2 according to the flow charts of FIGS. 3, 4a and 4b is schematically depicted in the time diagrams of FIG. 5.

FIG. 5(a) schematically depicts the evolution of the marking value applied by the node 1 in the time basis t1 of the node 1, in the form of a square wave having two values corresponding to the two marking values MA and MB (e.g. high value for MA and low value for MB). FIG. 5(a) also shows the packets Pk transmitted by the node 1 operating according to the flow chart of FIG. 3. It may be seen that, within each marking period, the first transmitted packet is a sample packet (slanted lines). Hence, a sequence of sample packets Pk1, Pk2, Pk3, Pk4, Pk5, . . . is transmitted from node 1 to node 2, the odd sample packets Pk1, Pk3, Pk5, . . . having marking value MA and the even sample packets Pk2, Pk4, . . . having marking value MB.

FIG. 5(*b*) show the packets Pk, including the sample packets Pk1, Pk2, Pk3, Pk4, Pk5, . . . as received by the node 2, in the time basis of the node 2. FIG. 5(*b*) also schematically depicts the evolution of the marking value applied by the node 2 in the time basis t2 of the node 2, in the form of a square wave having two values corresponding to the two marking values MA and MB (e.g. high value for MA and low value for MB).

FIG. 5(*b*) refers to a situation wherein the marking value of the each sample packet Pk1, Pk2, Pk3, Pk4, Pk5, . . . is equal to the marking value currently applied by the node 2 to packets Pk' and the node 2 behaves according to the flow chart of FIG. 4*a*. According to the flow chart of FIG. 4*a*, upon reception of each sample packet Pk1, Pk2, Pk3, Pk4, Pk5, . . . the node 2 marks the next packet Pk' to be transmitted to the node 1 as a sample packet (step 46), thereby transmitting to the node 1 a sequence of sample packets Pk1', Pk2', Pk3', Pk4', Pk5', . . . .

FIG. 5(*c*) depicts instead a situation wherein the marking value of the each sample packet Pk1, Pk2, Pk3, Pk4, Pk5, . . . is different from the marking value currently applied by the node 2 to packets Pk' and the node 2 behaves according to the flow chart of FIG. 4*b*.

In particular, in FIG. 5(*c*) it is assumed that the marking value of the sample packets Pk1, Pk2, Pk3, Pk4 and Pk5 is different from the marking value currently applied by the node 2 to packets Pk' upon reception of Pk1, Pk2, Pk3, Pk4 and Pk5 at the node 2. This may occur, for instance, if the node 2 is expressly delaying the switching of the marking value applied to the packet Pk' in order to filter out oscillations of the marking value so that each sample packet Pk2, Pk2, Pk3, Pk4 and Pk5 is received at the node 2 before the node 2 has decided to switch marking value. It shall be noticed that, although for simplicity in FIG. 5(*c*) all the delays applied by the node 2 have been represented as having a same duration, the applied delays typically have different durations ranging from 0 to a maximum value that depends on the maximum packet number value.

In such situation, therefore, for the sample packets Pk1, Pk2, Pk3, Pk4 and Pk5 the outcome of the check 45 is negative. According to the flow chart of FIG. 4*b*, upon reception of each sample packet Pk1, Pk2, Pk3, Pk4 and Pk5 the node 2 then continues marking the packets Pk' to be transmitted to the node 1 as non sample packets (step 47), until the node 2 decides to switch the marking value (step 49). After the switching step 49, the check of step 45 is repeated and provides a positive outcome, and then the node 2 marks the next packet Pk' to be transmitted to the node 1 as a sample packet (step 46). Also in this case, therefore, the node 2 transmits to the node 1 a sample packet Pk1', Pk2', Pk3', Pk4' and Pk5' corresponding to each sample packet Pk1, Pk2, Pk3, Pk4 and Pk5, whose transmission is however delayed relative to reception of the respective sample packet Pk1, Pk2, Pk3, Pk4 and Pk5.

It may be appreciated that both in the case of FIG. 5(*b*) and in the case of FIG. 5(*c*), each sample packet Pk1', Pk2', Pk3', Pk4', Pk5', . . . advantageously has the same marking value MA or MB as the corresponding sample packet Pk1, Pk2, Pk3, Pk4, Pk5, . . . from which it has been originated. In other words, each sample packet Pk1, Pk2, Pk3, Pk4, Pk5, . . . originated by the node 1 is bound to its marking period (and then to its marking value) even after it is "reflected" at the node 2.

In order to perform performance measurements on the sample packets Pk1, Pk2, Pk3, Pk4, Pk5, . . . and corresponding sample packets Pk1', Pk2', Pk3', Pk4', Pk5', . . . , two measurement points 10 and 20 may be provided in intermediate positions between the nodes 1 and 2, as schematically depicted in FIG. 1. This is not limiting. One or more measurement points may be provided, either in intermediate positions between the nodes 1 and 2 or at the nodes 1 and 2 themselves.

Each measurement point 10, 20 identifies the sample packets in both directions based on their sampling value SV and generates at least one performance parameter (e.g. a timestamp) for each identified sample packet, which is then used for providing performance measurements.

Figure 6:
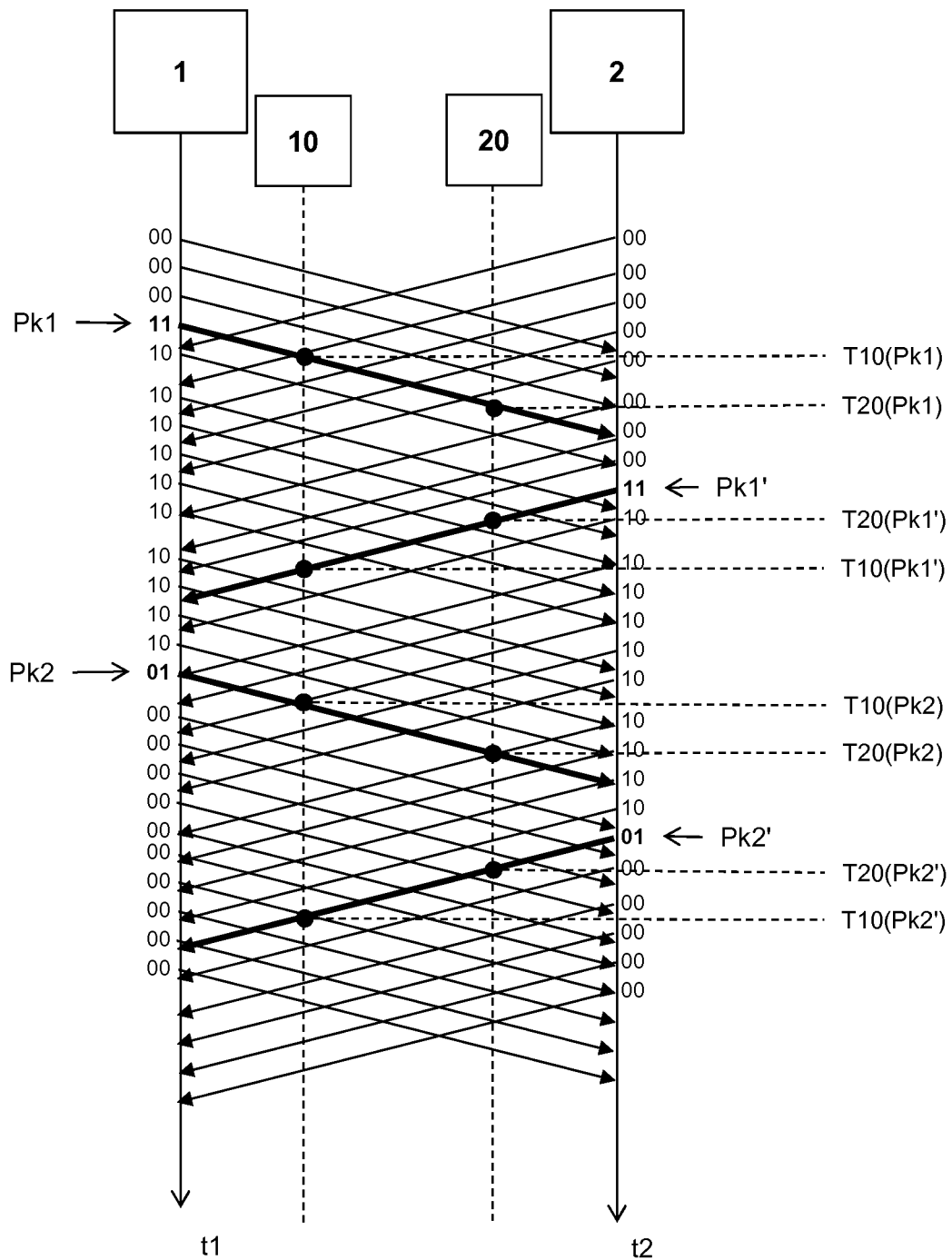
FIG. 6 schematically shows an exemplary operation of measurement points arranged on the path of the packets exchanged in the communication network of FIG. 1.

For instance, FIG. 6 shows a situation wherein the nodes 1 and 2 exchange packets Pk and Pk' according to the flow charts of FIGS. 3 and 4*b* described above, under the assumption that the nodes 1 and 2 implement the known spin bit technique of the QUIC protocol. Both the marking field MF and the sampling field SF comprise a single bit. The sampling value SV is assumed equal to "1" and the non sampling value NSV is assumed equal to "0". It may be appreciated that the node 2, acting as server in the spin bit mechanism, delays the reflection of the edges of the spin bit signal according to the known spin bit technique, and correspondingly delays the transmission of sample packets Pk1', Pk2' according to the flow chart of FIG. 4*b* described above. This way, during each marking period a single couple of samples Pk1-Pk1' and Pk2-Pk2' having the same marking value (namely "1" for Pk1-Pk1' and "0" for Pk2-Pk2') is advantageously provided.

As depicted in FIG. 6, the measurement point 10 may provide a timestamp T10(Pk1), T10(Pk1'), T10(Pk2), T10(Pk2') for each identified sample packet Pk1, Pk1', Pk2, Pk2' and, similarly, the measurement point 20 may provide a timestamp T20(Pk1), T20(Pk1'), T20(Pk2), T20(Pk2') for each identified sample packet Pk1, Pk1', Pk2, Pk2'.

The timestamps may then be gathered (e.g. at a management server cooperating with the measurement points 10, 20, not shown in the drawings) and processed to perform a number of time measurements.

One-way time measurements may be performed using timestamps relating to a same sample packet, as described in the above mentioned WO 2015/090364.

For instance, one-way delays between the two measurement points 10, 20 may be calculated for each single sample packet Pk1, Pk1', Pk2, Pk2' as follows:

$OWD(Pk1)=T20(Pk1)-T10(Pk1);$ $OWD(Pk1')=T10(Pk1')-T20(Pk1');$ $OWD(Pk2)=T20(Pk2)-T10(Pk2);$ $OWD(Pk2')=T10(Pk2')-T20(Pk2').$

Besides, RTT measurements between the measurement points 10, 20 may also be performed based on the timestamps generated for each couple of counter-propagating sample packets. This latter operation particularly benefits from the behaviour of the nodes 1 and 2. Within each marking period, indeed, a single couple of counter-propagating sample packets is expected at each measurement point 10, 20, upon which the RTT measurement shall be made. The measurement points 10, 20 may therefore uniquely and non-ambiguously identify them based on their marking value and sampling value SV, thereby providing reliable and accurate RTT measurements.

For instance, RTT measurements between the measurement points 10, 20 may be calculated as follows:

$$RTT(Pk1,Pk1')=T20(Pk1)-T10(Pk1)+T10(Pk1')-T20(Pk1');$$

$$RTT(Pk2,Pk2')=T20(Pk2)-T10(Pk2)+T10(Pk2')-T20(Pk2').$$

The obtained RTT measurement is particularly reliable. If, for instance, during a marking period the "reflected" sample packet Pk1' or Pk2' is lost before it reaches the measurement points 10, 20, both the measurement points 10, 20 are capable of detecting the loss (the "reflected" sample packet expected during the current marking period is not found within the packets transmitted from the node 2 to the node 1) and therefore refrain from providing RTT measurement for that marking period.

Besides, anyone of the measurement points 10, 20 may also provide RTT measurements, for example an RTT measurement between the node 1 and the node 2 based on the timestamps generated for two consecutive sample packets transmitted in a same direction (e.g. Pk1 and Pk2). For instance, the RTT measurement between the nodes 1 and 2 may be calculated by the measurement point 10 as follows:

$$RTT(1-2)=T10(Pk2)-T10(Pk1); \text{ or}$$

$$RTT(1-2)=T10(Pk2')-T10(Pk1').$$

This latter RTT measurement is advantageously easier for the measurement point 10 than the above described known measurement as duration of the spin bit period. Identifying the sample packets Pk1, Pk2 or Pk1', Pk2' amongst the packets Pk and Pk' exchanged between the nodes 1 and 2 is indeed more immediate for the measurement point 10 then identifying the edges of the spin bit signal which, as described above, may be non sharp.

Other RTT measurements may be performed by any one of the measurement points 10, 20. For example, the measurement point 10 may perform the following RTT measurements:

$$RTT10(Pk1,Pk1')=T10(Pk1')-T10(Pk1)$$

$$RTT10(Pk1',Pk2)=T10(Pk2)-T10(Pk1').$$

According to the first embodiment described above with reference to the flow chart of FIG. 3, the node 1 autonomously decides which packets Pk shall be marked as sample packets (see step 31 and related description), irrespective of the position of the sample packets Pk' received within the packet flow received from the node 2.

According to embodiments of the present invention, the node 1 may generate a sample packet Pk upon reception of a preceding sample packet Pk' from the node 2, namely it may—upon reception from the node 2 of each packet Pk' comprising the sampling value SV—copy the sampling value SV in one packet Pk to be transmitted to the node 2.

In particular, according to a second embodiment of the present invention, the node 1 autonomously decides which packet Pk shall be marked as a sample packet only when a new marking cycle starts, where the expression "marking cycle" indicates the concatenation of two consecutive marking periods, which as such have associated different applicable marking values MA and MB.

Figure 7:
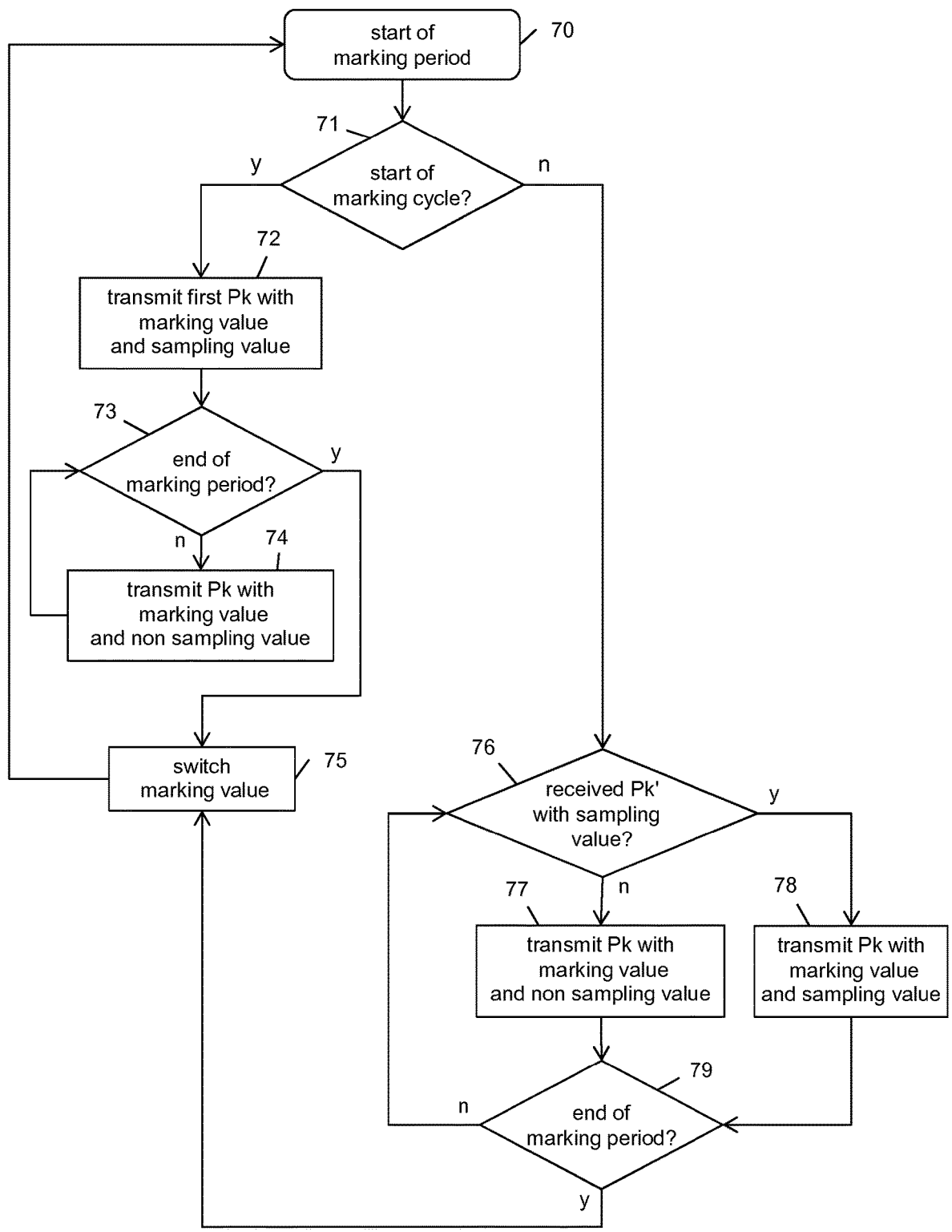
FIGS. 7 and 8 are flow charts of the operation of the first node of the communication network of FIG. 1, according to a second and third embodiments of the present invention, respectively.

According to such second embodiment, as shown in the flow chart of FIG. 7, at the beginning of each marking period (step 70) triggered by the node 1 switching the applicable marking value from MA to MB or vice versa, if the beginning of the marking period coincides also with the beginning of a marking cycle (step 71), the node 1 marks one of the packets Pk to be transmitted to the node 2 as a sample packet (step 72). Preferably, such packet is the first one to be transmitted after the beginning of the marking period. To this purpose, the node 1 preferably writes:
- (i) the currently applicable marking value (e.g. MA) in its marking field MF; and
- (ii) the sampling value SV in its sampling field SF.

Then, until the end of the current marking period (step 73), the node 1 continues marking the packets Pk to be transmitted to the node 2 as non sample packets (step 74), by writing:
- (i) the currently applicable marking value (e.g. MA) in their marking fields MF; and
- (ii) the non sampling value NSV in their sampling fields SF.

Upon expiration of the marking period, the node 1 switches the marking value (e.g. from MA to MB) (step 75) and reverts to step 70.

Steps 72-75 are iterated at the first marking period of each marking cycle. This way, the node 1 marks the first packet Pk transmitted during the first marking period of each marking cycle as a sample packet.

If, instead, the beginning of the marking period does not coincide with the beginning of a marking cycle (step 72), while the node 1 does not receive any sample packet Pk' from the node 2 (step 76), it preferably marks the packets Pk to be transmitted to the node 2 as non sample packets (step 77), by writing:
- (i) the currently applicable marking value (e.g. MA) in their marking fields MF; and
- (ii) the non sampling value NSV in their sampling fields SF.

When instead the node 1 receives from the node 2 a sample packet Pk, it preferably marks the next packet Pk to be transmitted to the node 2 as a sample packet (step 78). To this purpose, the node 1 preferably writes in the next packet Pk to be transmitted to the node 2:
- (i) the currently applicable marking value (e.g. MA) in its marking field MF; and
- (ii) a sampling value SV in its sampling field SF.

The node 1 iterates steps 76-78 until the end of the marking period (step 79). Upon expiration of the marking period, the node 1 preferably switches the marking value (e.g. from MA to MB) (step 75) and reverts to step 70.

Steps 76-79 are iterated at the second marking period of each marking cycle. This way, during the second marking period of each marking cycle, the node 1 marks as sample packet the next packet Pk to be transmitted after reception of a sample packet Pk' from the node 2.

With reference for instance to the scenario of FIG. 6, therefore, the node 1 autonomously generates the sample packet Pk1 during the first marking period of the marking cycle (applicable marking value "1"), while during the second marking period of the marking cycle (applicable marking value "0") it generates the packet Pk2 by reflection of the received sample packet Pk1'. At the end of this second marking period, a new marking cycle begins (applicable marking value again equal to "1"), and therefore the node 1 will autonomously generate a further sample packet (not shown in FIG. 6) to be sent to the node 2, irrespective of reception of the sample packet Pk2' from the node 2.

The embodiment shown in FIG. 7 advantageously provides very accurate measurement results, especially as far as the RTT measurements provided by the measurement point 10 or 20 between the node 1 and the node 2. As described above, indeed, such RTT measurement is based on the timestamps generated for two consecutive sample packets transmitted in a same direction, for example the sample packets Pk1 and Pk2 shown in FIG. 6. If the node 1 operates according to the flow chart of FIG. 7, it may be appreciated that the sample packets Pk1 and Pk2 are related through a double reflection, namely a first reflection at the node 2 (which reflects the received sample packet Pk1 into Pk1') and a second reflection at the node 1 (which reflects the received sample packet Pk1' into Pk2). Hence, the RTT measurement based on the timestamps of Pk1 and Pk2 is advantageously free of possible inaccuracies introduced by autonomous determination of the sample packet Pk2 by the node 1.

According to a third embodiment of the present invention, the node 1 autonomously decides which packet Pk shall be marked as a sample packet during a certain marking period, only to restart the performance measurement after a whole marking period has lapsed without any sample packet Pk' being received from the node 2. This may be due to the fact that a sample packet Pk' is lost, or to the fact that the sample packet Pk' is delayed to such an extent that it moves to the subsequent marking period.

Figure 8:
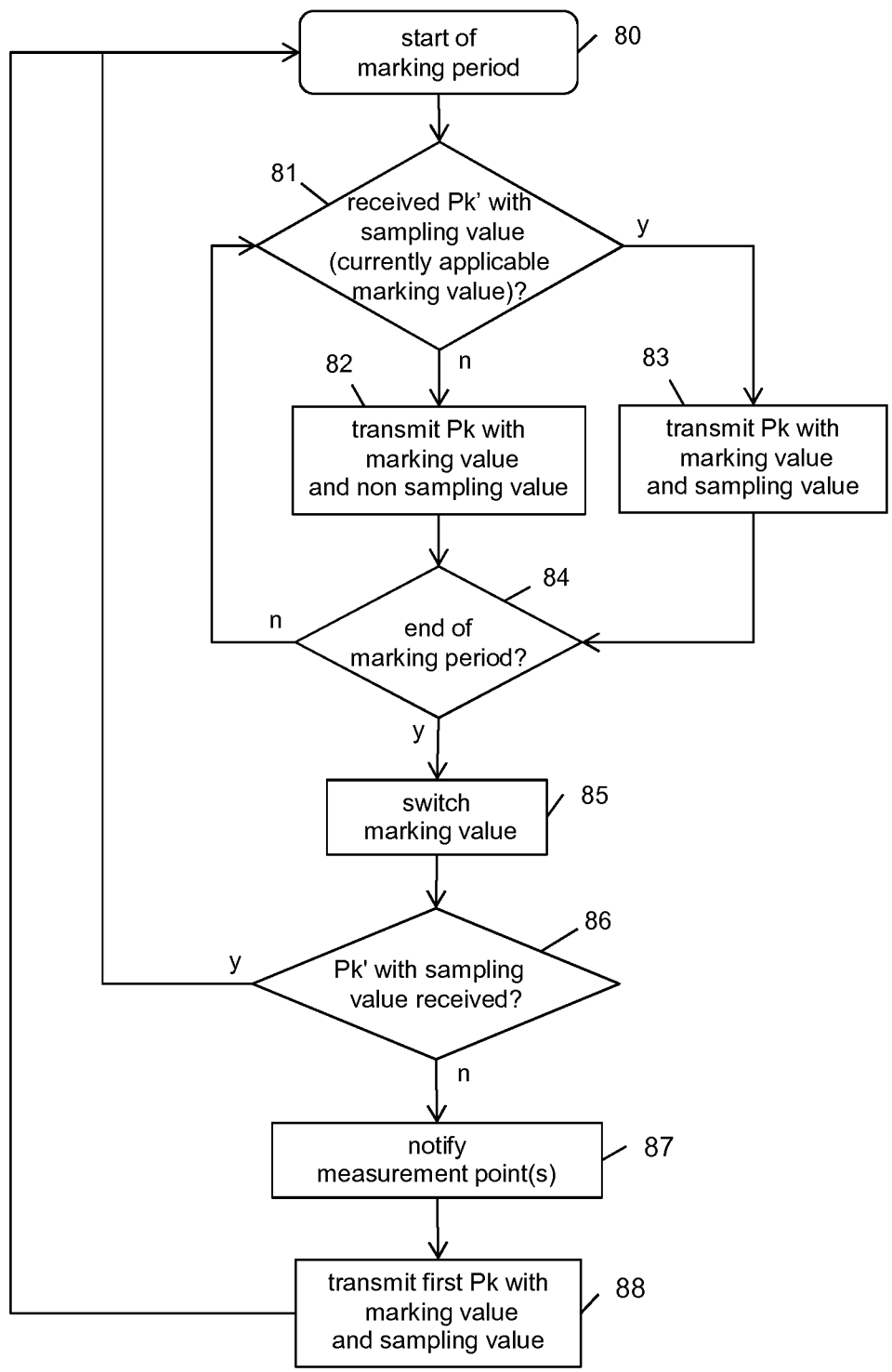

According to such third embodiment, as shown in the flow chart of FIG. 8, during each marking period (step 80) whose start is triggered by the node 1 switching the applicable marking value from MA to MB or vice versa, node 1 continuously monitors reception of possible sample packets Pk' from the node 2 (step 81). At step 81, preferably, the node 1 only looks for possible samples packets Pk' whose marking value is equal to the one currently applicable to packets Pk to be transmitted to the node 2. This way, the node 1 ignores possible sample packets Pk' which, due to excessive delay, have moved from the previous marking period to the current one.

While the node 1 does not receive any sample packet Pk' from the node 2, it preferably marks the packets Pk to be transmitted to the node 2 as non sample packets (step 82), by writing:
  (i) the currently applicable marking value (e.g. MA) in their marking fields MF; and
  (ii) the non sampling value NSV in their sampling fields SF.

When instead the node 1 receives from the node 2 a sample packet Pk, it preferably marks the next packet Pk to be transmitted to the node 2 as a sample packet (step 83). To this purpose, the node 1 preferably writes in the next packet Pk to be transmitted to the node 2:
  (i) the currently applicable marking value (e.g. MA) in its marking field MF; and
  (ii) a sampling value SV in its sampling field SF.

The node 1 iterates steps 81-83 until the end of the marking period (step 84). Upon expiration of the marking period, the node 1 preferably switches the marking value (e.g. from MA to MB) (step 85) and checks whether a sample packet Pk' has been received from the node 2 during the expired marking period (step 86).

In the affirmative, the node 1 preferable reverts to step 80.

In the negative, the node 1 preferably notifies the measurement point(s) that a marking period with no sample packets has been detected and that accordingly the performance measurement shall be restarted (step 87). For this purpose, the node 1 may provide a further marking period with no sample packets, by marking as non-sample packets all the packets Pk to be transmitted to the node 2 during the marking period subsequent to the determination of step 86.

Then, after notification, the node 1 restarts the performance measurement at the marking period subsequent to the notification step 87, by marking one of the packets Pk to be transmitted to the node 2 as a sample packet (step 88). Preferably, such packet is the first one to be transmitted after the beginning of such marking period.

To this purpose, the node 1 preferably writes:
  (i) the currently applicable marking value (e.g. MA) in its marking field MF; and
  (ii) the sampling value SV in its sampling field SF.

The node 1 then reverts to step 80.

As described above, the method for performing time measurements according to the present invention is applicable to any situation where the node 2 switches the marking value applicable to the packets Pk' depending on the marking value of the received packets Pk, including—but not limited to—the situation where the nodes 1 and 2 implement the known spin bit technique.

As discussed above, if the node 2 is configured to filter out possible oscillations in the marking value of the received packets Pk by delaying the switching of the marking value to be applied to packets Pk', the generation of sample packets Pk' by the node 2 is preferably according to the flow chart of FIG. 4b. When also the node 1 generates the sample packets Pk by reflection of the sample packets Pk' received from the node 2 (see step 78 in the flow chart of FIG. 7 and step 83 in the flow chart of FIG. 8), the generation of sample packets Pk by the node 1 is preferably similar to the flow chart of FIG. 4b, namely: upon reception of a sample packet Pk' from the node 2 (steps 76 in FIG. 7 or 81 in FIG. 8), the node 1 preferably checks its marking value; if its marking value is different from the marking value currently applied by the node 1 to the packets Pk to be transmitted to the node 2, the node 1 preferably marks the next packet Pk to be transmitted to the node 2 as a sample packet. Otherwise, if the node 1 determines that the marking value comprised in the received sample packet Pk' is equal to the marking value currently applied by the node 1 to the packets Pk to be transmitted to the node 2 (which may occur e.g. if the node 1 is delaying the switching of the marking value), the node 1 preferably continues marking the packets Pk to be transmitted to the node 2 as non sample packets, until it determines that the marking value it is applying to packets Pk shall be switched. Then, the node 1 marks the next packet Pk to be transmitted to the node 2 as a sample packet.

According to other variants of the present invention, the node 2 may be configured to filter out the possible oscillations in the marking value of the received packets Pk without delaying the switching of the marking value to be applied to packets Pk'. This is advantageous in that the generation of sample packets by the node 2 may be carried out according to the flow chart of FIG. 4a, which is simpler from the logical and implementation point of views.

According to a particularly advantageous variant of the present invention, the node 1 and/or the node 2 preferably filters out possible oscillations of the marking value of the received packets Pk using a security gap SG having a predefined duration.

As far as the node 1 is concerned, with reference to the flow chart of FIG. 3, at step 32 the node 1 preferably checks whether the currently received packet Pk' has a marking value (e.g. MB) different from the previously received one (which were marked e.g. by MA). In the affirmative, the node 1 preferably switches the marking value applicable to the packets Pk to be transmitted to the node 2 (from MA to MB) and keeps it constant for the whole security gap SG. For the whole security gap SG, the check of the marking value comprised in the received packets Pk' is disabled and the switching of the marking value applicable to packets Pk is also disabled. Hence, if during the security gap SG the node 1 receives further packets Pk' marked by MA, the node 1 does not switch again the marking value. After the security gap SG has lapsed, the node 1 preferably enables again both the checking of the marking value comprised in the received packets Pk and the switching of the marking value applicable to packets Pk'.

Similarly, with reference to the flow chart of FIG. 4a, at step 43 the node 2 preferably checks whether the currently received packet Pk has a marking value (e.g. MB) different from the previously received one (which were marked e.g. by MA). In the affirmative, the node 2 preferably switches the marking value applicable to the packets Pk' to be transmitted to the node 1 (from MA to MB) and keeps it constant for the whole security gap SG. For the whole security gap SG, the check of the marking value comprised in the received packets Pk is disabled and the switching of the marking value applicable to packets Pk' is also disabled. Hence, if during the security gap SG the node 2 receives further packets Pk marked by MA, the node 2 does not switch again the marking value. After the security gap SG has lapsed, the node 2 preferably enables again both the checking of the marking value comprised in the received packets Pk and the switching of the marking value applicable to packets Pk'.

Preferably, the duration of the security gap SG is set long enough to absorb reception sequence errors affecting the received packets Pk', Pk so that, upon expiration of the security gap SG, the marking value comprised in the received packets Pk', Pk does not exhibit oscillations between MA and MB. On the other hand, the duration of the security gap SG is set lower than a round trip time between the nodes 1 and 2. This way, advantageously, each node 1, 2 does not miss any switching of the marking value in the received packets Pk', Pk as applied by the other node 2, 1. For instance, the duration of the security gap SG may be 1 ms.

Instead of waiting that a security gap SG of predefined duration has lapsed before checking again the marking value of the received packets Pk', Pk, according to other variants other criteria may be used by the nodes 1 and/or 2. For example, each node 1, 2 may switch the marking value upon reception of the first packet Pk', Pk having a marking value different from the previous one and keep it constant until:
- the packet number comprised in the received packets Pk', Pk has increased to its maximum value, returned back to 0 and then reached again the value comprised in the first received packet Pk', Pk whose marking value was different from the previously received one; or
- N packets Pk', Pk have been received, N being a fixed number.

These variants (security gap SG, packet number or fixed number N) are all advantageous over the delaying of the reflection of the edges of the spin bit signal at the server based on the value of packet number field comprised in the received packets. Such delay indeed induces an error in the RTT measurement between the nodes 1 and 2, because the reflection of each edge of the spin bit signal may occur suddenly or with an unpredictable delay.

The described variants instead allow filtering out possible oscillations at the edges of the spin bit signal, without delaying the reflection of the edges, and therefore without introducing unpredictable errors on the RTT measurements.

Moreover, it may be appreciated that the two variants not using the packet number (which is cyphered, and then it is readable only by the nodes 1 and 2) may also be used by the measurement points 10 and 20 for avoiding detection of "false" marking periods due to errors in the sequence of packets.

In the previous description, it has been assumed that the sampling field SF may be set to either a sampling value SV or a non sampling value NSV. This is the case, for instance, if the sampling field SF is made of a single bit. More generally, the sampling field SF may comprise n bits ($n \geq 1$), and may accordingly be set to any of $2^n$ values. Preferably, one of such values (e.g. the all-zero value) may be considered as a non sampling value NSV, while the other $k=2^n-1$ values may be considered as k different sampling values $SV(1), SV(2), \ldots SV(k)$.

According to variants of the present invention, the node 1 is preferably configured to provide, during each marking period, a sample packet Pk for each sampling value. For instance, if n=2, during a same marking period the node 1 may write a first sampling value $SV(1)=01$ in a first packet Pk, a second sampling value $SV(2)=10$ in a second packet Pk and a third sampling value $SV(3)$ in a third packet Pk. Hence, for each marking period, 3 sample packets are provided by node 1, having different sampling values.

As far as the node 2 is concerned, its behavior is the same as shown in FIG. 4a (in case of no delay in the switching of the marking value) or FIG. 4b (in case of possible delays in the switching of the marking value). Upon reception of each sample packet Pk from the node 1, indeed, the node 2 copies its sampling value in the first packet Pk to be transmitted to the node 1 (possibly waiting for the next switching of the marking value applicable to packets Pk', according to the flow chart of FIG. 4b). Hence, for each sampling value, during each marking period a couple of counter-propagating sample packets having the same sampling value and the same marking value is exchanged between the nodes 1 and 2. This allows increasing the sampling rate (and therefore the number of available sample packets) without shortening the marking period.

The measurement points 10, 20 may identify such sample packets and perform the above described time measurements on them, either by considering sample packets having a same sampling value separately, or by considering all the sample packets as a whole, irrespective of their sampling values.

The invention claimed is:

1. A method for enabling a performance measurement in a packet-switched communication network, comprising:
   a) exchanging between a first node and a second node of said communication network packets comprising a marking field and a sampling field, the marking field comprising a marking value, wherein said marking value is alternately switched between two alternative marking values, switching said marking value to be applied to the marking field of packets to be transmitted to the first node by said second node being dependent on the marking value comprised in the marking field of packets received at said second node from said first node;
   b) at said first node, during each marking period, writing a sampling value in the sampling field of one packet to be transmitted to said second node; and
   c) at said second node, upon reception from said first node of each packet comprising said sampling value in its sampling field, copying said sampling value in the sampling field of one packet to be transmitted to said first node,
wherein at step a) each one of said first node and said second node switches the marking value to be applied to the marking fields of packets to be transmitted to the other node upon detection of a change of the marking value in the marking fields of packets received from the other node, or
at step a) said second node switches said marking value to be applied to the marking fields of packets to be transmitted to said first node with a delay with respect to detection of a change of the marking value in the marking fields of packets received from said first node.

2. The method according to claim 1, wherein said step b) comprises:
b1) writing said sampling value in the sampling field of the nth packet to be transmitted after the beginning of a marking period, n being an integer equal to or higher than 1; or
b2) upon reception from said second node of a preceding packet comprising said sampling value in its sampling field, copying said sampling value in the sampling field of one packet to be transmitted to said second node.

3. The method according to claim 2, wherein said step b) comprises
step b1) during the first marking period of each marking cycle; and
step b2) during the second marking period of each marking cycle.

4. The method according to claim 2, wherein said step b) comprises:
step b1) during each marking period at which said performance measurement is started or restarted; and
step b2) during each marking period other than said each marking period at which said performance measurement is started or restarted.

5. The method according to claim 1, wherein when at step a) each one of said first node and said second node switches the marking value to be applied to the marking fields of packets to be transmitted to the other node upon detection of a change of the marking value in the marking fields of packets received from the other node:
at step a) said switching said marking value to be applied to the marking fields of packets to be transmitted to the other node comprises, at said first node and/or at said second node, for each packet received from the other node, checking whether said received packet has a marking value in its marking field that is different from marking values in the marking fields of the previously received packet and, in the affirmative:
switching said marking value to be applied to the marking fields of packets to be transmitted to the other node and disabling further switching of the marking value to be applied to the marking fields of packets to be transmitted to the other node until a predefined condition is fulfilled;
upon occurrence of said predefined condition, enabling again further switching of the marking value to be applied to the marking fields of packets to be transmitted to the other node.

6. The method according to claim 5, wherein said predefined condition is one of the following:
a security gap time having a predefined duration is lapsed;
a packet number comprised in packets received from the other node has increased to a maximum value, returned back to 0 and then reached again the value that was comprised in said received packet whose marking value in its marking field was different from that of the previously received packet; or
N packets have been received from the other node, N being a predefined number.

7. The method according to claim 1, wherein when at step a) said second node switches said marking value to be applied to the marking fields of packets to be transmitted to said first node with a delay with respect to detection of a change of the marking value in the marking fields of packets received from said first node:
at step c) said copying said sampling value comprises checking whether the marking value of in the marking field of said received packet comprising said sampling value is equal to the marking value currently applied to the marking fields of packets to be transmitted to said first node, and
c1) in the affirmative, copying said sampling value in the sampling field of one packet to be transmitted to said first node;
c2) in the negative, waiting until said marking value to be applied to the marking fields of said packets to be transmitted to said first node is switched again and then performing step c1).

8. A method for performing a performance measurement in a packet-switched communication network, said method comprising the steps of the method according to claim 1 and comprising:
d) at at least one measurement point, providing performance parameters relating to said packets comprising said sampling value in its sampling field, said performance measurement being based on said performance parameters.

9. A method for exchanging packets between a first node and a second node of a packet-switched communication network, the packets each including a marking field and a sampling field, the method comprising:
a) alternately switching a marking value comprised in the marking filed of said packets between two alternative marking values, switching said marking value to be applied to the marking fields of packets to be transmitted to the first node by said second node being dependent on the marking value comprised in the marking fields packets received at said second node from said first node:
b) at said first node, during each marking period, writing a sampling value in the sampling filed of one packet to be transmitted to said second node; and
c) at said second node, upon reception from said first node of each packet comprising said sampling value in its sampling field, copying said sampling value in the sampling field of one packet to be transmitted to said first node,
wherein at step a) each one of said first node and said second node switches the marking value to be applied to the marking fields of packets to be transmitted to the other node upon detection of a change of the marking value in the marking fields of packets received from the other node, or
at step a) said second node switches said marking value to be applied to the marking fields of packets to be transmitted to said first node with a delay with respect to detection of a change of the marking value in the marking fields of packets received from said first node.

10. A packet-switched communication network comprising a first node and a second node configured to exchange packets comprising a marking filed and a sampling field, the marking field comprising a marking value, wherein said marking value is alternately switched between two alternative marking values, said second node being configured to switch said marking value to be applied to the marking fields of packets to be transmitted to said first node depending on the marking value comprised in the marking field of packets received from said first node, wherein:
- said first node is configured to, during each marking period, write a sampling value in the sampling field of one packet to be transmitted to said second node; and
- said second node is configured to, upon reception from said first node of each packet comprising said sampling value in its sampling field, copy said sampling value in the sampling field of one packet to be transmitted to said first node,
- wherein each one of said first node and said second node switches the marking value to be applied to the marking fields of packets to be transmitted to the other node upon detection of a change of the marking value in the marking fields of packets received from the other node, or
- said second node switches said marking value to be applied to the marking fields of packets to be transmitted to said first node with a delay with respect to detection of a change of the marking value in the marking fields of packets received from said first node.

11. The packet-switched communication network of claim 10, further comprising at least one measurement point configured to provide performance parameters relating to said packets comprising said sampling value in its sampling field.

\* \* \* \* \*